(12) United States Patent
Kim et al.

(10) Patent No.: US 11,301,127 B2
(45) Date of Patent: Apr. 12, 2022

(54) METHODS AND APPARATUS FOR CORRECTING INPUT ERROR IN INPUT APPARATUS

(71) Applicant: Samsung Electronics Co., Ltd., Gyeonggi-do (KR)

(72) Inventors: Gwan-Hyung Kim, Seoul (KR); Joo-Hoon Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/374,365

(22) Filed: Apr. 3, 2019

(65) Prior Publication Data

US 2019/0227706 A1     Jul. 25, 2019

Related U.S. Application Data

(63) Continuation of application No. 13/344,158, filed on Jan. 5, 2012, now Pat. No. 10,254,951.

(30) Foreign Application Priority Data

Jan. 5, 2011   (KR) ..................... 10-2011-0000860

(51) Int. Cl.
    *G06F 3/0488*      (2013.01)
    *G06F 3/0354*      (2013.01)
    (Continued)

(52) U.S. Cl.
    CPC ...... *G06F 3/04883* (2013.01); *G06F 3/03545* (2013.01); *G06F 3/044* (2013.01);
    (Continued)

(58) Field of Classification Search
    CPC ........ G06F 3/0488–04886; G06F 3/041–0412; G06F 3/0416; G06F 3/03545;
    (Continued)

(56) References Cited

U.S. PATENT DOCUMENTS

| 5,956,020 A | 9/1999 | D'Amico et al. |
|---|---|---|
| 2004/0090431 A1 | 5/2004 | Kong et al. |

(Continued)

FOREIGN PATENT DOCUMENTS

| EP | 1 659 481 | 5/2006 |
|---|---|---|
| JP | 9-138730 | 5/1997 |

(Continued)

OTHER PUBLICATIONS

European Search Report dated Nov. 3, 2014 issued in counterpart application No. 12150182.9-1972.

(Continued)

*Primary Examiner* — David Tung

(74) *Attorney, Agent, or Firm* — The Farrell Law Firm, P.C.

(57) ABSTRACT

Methods and apparatus are provided for correcting an input error in an input apparatus capable of touch inputs of a first touch input scheme and a second touch input scheme. Upon detecting a touch input of the first touch input scheme, an activity corresponding to the detected touch input is executed and activity execution information corresponding to the activity is stored. The activity executed in accordance with the touch input of the first touch input scheme is cancelled, when a touch input of the second touch input scheme occurs before the touch input of the first touch input scheme is released or before a preset timer expires. The first touch input scheme and the second touch input scheme are different schemes.

6 Claims, 6 Drawing Sheets

(51) Int. Cl.
  *G06F 3/041*  (2006.01)
  *G06F 3/044*  (2006.01)
  *G06F 3/046*  (2006.01)
  *G06F 3/04883*  (2022.01)

(52) U.S. Cl.
  CPC .......... *G06F 3/046* (2013.01); *G06F 3/0412* (2013.01); *G06F 3/0418* (2013.01); *G06F 2203/04106* (2013.01)

(58) Field of Classification Search
  CPC ......... G06F 3/0418; G06F 2203/04101; G06F 2203/04104; G06F 2203/04106; G06F 2203/04108; G06F 2203/04807–04808
  See application file for complete search history.

(56) References Cited

U.S. PATENT DOCUMENTS

| | | | |
|---|---|---|---|
| 2006/0012580 A1 | 1/2006 | Perski et al. | |
| 2006/0109252 A1* | 5/2006 | Kolmykov-Zotov | ............... G06F 3/03545 345/173 |
| 2009/0058829 A1 | 3/2009 | Kim et al. | |
| 2009/0061947 A1 | 3/2009 | Park et al. | |
| 2009/0141008 A1 | 6/2009 | Johnson et al. | |
| 2009/0273571 A1 | 11/2009 | Bowens | |
| 2009/0303201 A1 | 12/2009 | Isoda et al. | |
| 2010/0053095 A1 | 3/2010 | Wu et al. | |
| 2010/0090971 A1 | 4/2010 | Choi et al. | |
| 2010/0182247 A1 | 7/2010 | Petschnigg et al. | |
| 2010/0275150 A1 | 10/2010 | Chiba et al. | |
| 2010/0283754 A1* | 11/2010 | Nakao | ............... G06F 3/04847 345/173 |
| 2010/0295796 A1* | 11/2010 | Roberts | ............... G06F 3/0412 345/173 |
| 2010/0333043 A1 | 12/2010 | Faris et al. | |
| 2011/0050630 A1 | 3/2011 | Ikeda | |
| 2012/0158629 A1 | 6/2012 | Hinckley et al. | |

FOREIGN PATENT DOCUMENTS

| | | |
|---|---|---|
| KR | 1020090024006 | 3/2009 |
| KR | 1020100041107 | 4/2010 |

OTHER PUBLICATIONS

Korean Office Action dated Dec. 27, 2017 issued in counterpart application No. 10-2011-000860, 8 pages.
European Search Report dated Jun. 11, 2018 issued in counterpart application No. 12150182.9-1216, 7 pages.
Korean Office Action dated Oct. 4, 2018 issued in counterpart application No. 10-2011-0000860, 8 pages.

* cited by examiner

METHODS AND APPARATUS FOR CORRECTING INPUT ERROR IN INPUT APPARATUS

PRIORITY

This application is a Continuation of application Ser. No. 13/344,158 filed with the U.S. Patent and Trademark Office on Jan. 5, 2012, and claims priority under 35 U.S.C. § 119(a) to a Korean Patent Application filed in the Korean Intellectual Property Office on Jan. 5, 2011 and assigned Serial No. 10-2011-0000860, the entire disclosure of each of which is incorporated herein by reference.

BACKGROUND OF THE INVENTION

1. Field of the Invention

The present invention relates generally to an input apparatus capable of a touch and a pen input, and more particularly, to a method and apparatus for detecting and correcting an input error in the input apparatus.

2. Description of the Related Art

Many display devices employ a touch screen input scheme in which a user may input data by directly touching the screen using his or her fingertip or a stylus pen. This touch screen input scheme is mainly adopted in personal mobile terminals such as, for example, a smart phone, a mobile phone, a notebook computer, an All-in-One Personal Computer (PC), a tablet PC, and a Portable Multimedia Player (PMP). An intuitive and convenient user interface may be provided via the touch screen input scheme, which specifically allows for the inputting information about a position that a user has indicated by touching a specific position on a display screen instead of using a keyboard, a mouse, and physical buttons. A pen-based touch input scheme is suitable for graphic works such as, for example, Computer-Aided Design (CAD).

The touch screen input scheme, which is also referred to as digitizer and an Electric Graphic Input Panel (EGIP), may be roughly classified into a resistive scheme, a capacitive scheme, and an ElectroMagnetic Resonance (EMR) scheme, according to the method of detecting the position indicated by the user.

The resistive scheme detects a position pressed according to pressure by detecting a change in current with a Direct Current (DC) voltage applied thereto. Specifically, the resistive scheme may detect a direct contact between two thin conductive layers on the screen due to pressure from a fingertip or a stylus pen. The resistive scheme may detect any object, regardless of whether it is a conductor or a non-conductor, because this scheme detects position by pressure.

The capacitive scheme detects a touch point using capacitance coupling with an Alternating Current (AC) voltage applied thereto. Specifically, the capacitive scheme may detect only the conductive object, and requires a contact area greater than or equal to a predetermined area to ensure a detectable change in capacitance. Therefore, the capacitive scheme may detect a position when the user inputs data using his or her fingertip. However, when the user inputs data using a conductive tip, the capacitive scheme may not detect the position due to the small contact area caused by the conductive tip.

The EMR scheme employs a digitizer sensor substrate including an array of loop coils. Accordingly, if the user moves a pen, the pen is driven by an AC signal to cause an oscillating magnetic field, which induces a signal in the coils. The position of the pen is detected based on the signal induced in the coils.

Unlike the resistive scheme, the EMR scheme does not necessarily have the sensor substrate disposed in front of a display module. Instead the EMR scheme may have the sensor substrate disposed at the rear of the display module, because this scheme disposes a plurality of coils on the substrate and identifies a position of the pen by detecting a change in electromagnetic field occurring by an access of the pen to the sensor substrate.

Accordingly, a multi-input apparatus capable of both a digitizer (touch) input of the EMR scheme and a touch input of the capacitive scheme may be provided. However, when a part of the hand touches the touch screen during pen input, an input unintended by the user may occur.

SUMMARY OF THE INVENTION

The present invention has been made to address at least the above problems and/or disadvantages and to provide at least the advantages described below. Accordingly, an aspect of the present invention provides a method and apparatus for detecting and correcting an input error having occurred without user's intention in an input apparatus capable of both a touch input of a capacitive scheme and a pen input of an EMR scheme.

In accordance with an aspect of the present invention, a method is provided for correcting an input error in an input apparatus capable of touch inputs of a first touch input scheme and a second touch input scheme. The method includes, upon detecting a touch input of the first touch input scheme, executing an activity corresponding to the detected touch input and storing activity execution information corresponding to the activity; and cancelling the activity executed in accordance with the touch input of the first touch input scheme, when a touch input of the second touch input scheme occurs before the touch input of the first touch input scheme is released, with the first touch input scheme and the second touch input scheme being different schemes.

In accordance with another aspect of the present invention, an apparatus is provided for an input error in an input apparatus capable of touch inputs of a first touch input scheme and a second touch input scheme, with the apparatus including: an input unit including a touch screen panel for detecting a touch input of the first touch input scheme and a pen input unit for detecting a touch input of the second touch input scheme; and a controller for, upon detecting the touch input of the first touch input scheme, executing an activity corresponding to the detected touch input and storing activity execution information corresponding to the activity, and for cancelling the activity executed in accordance with the touch input of the first touch input scheme, when a touch input of the second touch input scheme occurs before the touch input of the first touch input scheme is released, with the first touch input scheme and the second touch input scheme being different schemes.

In accordance with a further aspect of the present invention, a method is provided for correcting an input error in an input apparatus capable of a touch input of a first touch input scheme and a touch input of a second touch input scheme, with the method including: upon detecting the touch input of the first touch input scheme, starting a timer that operates for a preset time, executing an activity corresponding to the detected touch input, and storing activity execution information corresponding to the activity; and cancelling the activity executed in accordance with the touch input of the first touch input scheme, when the touch input of the second touch input scheme occurs before the timer expires, with the first touch input scheme and the second touch input scheme being different schemes.

In accordance with an additional aspect of the present invention, an apparatus is provided for correcting an input error in an input apparatus capable of a touch input of a first touch input scheme and a touch input of a second touch input scheme, with the apparatus including an input unit including a touch screen panel for detecting the touch input of the first touch input scheme and a pen input unit for detecting the touch input of the second touch input scheme; and a controller for, upon detecting the touch input of the first touch input scheme, starting a timer that operates for a preset time, executing an activity corresponding to the detected touch input and storing activity execution information corresponding to the activity, and for cancelling the activity executed in accordance with the touch input of the first touch input scheme when the touch input of the second touch input scheme occurs before the timer expires, with the first touch input scheme and the second touch input scheme being different schemes.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EMBODIMENTS OF THE PRESENT INVENTION

Figure 1:
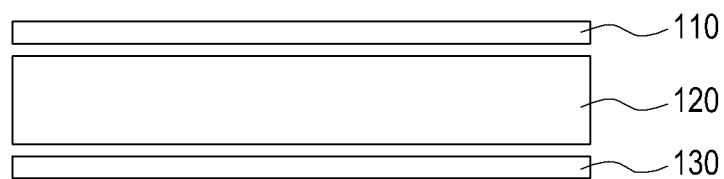
FIG. 1 is a diagram illustrating a cross section of a display of an input apparatus to which embodiments of the present invention are applicable.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention relate to an input apparatus capable of providing input based on different first and second touch input schemes. Specifically, embodiments of the present invention provide a method and apparatus for detecting and correcting an input error unintended by a user in an input apparatus capable of a touch screen input of a capacitive scheme (the first input scheme) and a pen input of an EMR scheme (the second input scheme).

FIG. 1 is a diagram illustrating a cross section of a display of an input apparatus to which embodiments of the present invention are applicable.

Referring to FIG. 1, the input apparatus, to which embodiments of the present invention are applicable, includes a display panel module 120 having a general Thin Film Transistor-Liquid Crystal Display (TFT-LCD) display panel or Organic Light Emitting Display (OLED) display panel for displaying images. The input apparatus also includes a Touch Screen Panel (TSP) 110 disposed on the top of the display panel module 120 for detecting a touch input of the capacitive scheme. The input apparatus further includes a digitizer module 130 disposed on the bottom of the display panel module 120 for detecting a pen input of the EMR scheme.

When the display panel module 120 is embodied as the TFT-LCD display panel, the display panel module 120 may include a liquid crystal panel on which images are formed, and a backlight assembly for irradiating light to the rear of the liquid crystal panel. When the display panel module 120 is embodied as the OLED display panel, the display panel module 120 may include an upper electrode, an organic material layer, a lower electrode, and a substrate.

In order for a user to conveniently input data using a pen, the input apparatus may be set to nullify a touch input caused by the hand when a distance between the pen and the EMR sensor substrate is less than or equal to a pen recognition distance, such as, for example, 2 to 3 centimeters (cm). Generally, however, when writing on paper, most people habitually place the bottom of the hand holding the pen on the paper before writing, thus causing a possible unintended input error. In order to prevent this input error, the user would have to place the pen on the touch screen before putting the bottom of the hand thereon during pen input. However, this pose may be uncomfortable because it is different from the general pen input pose. Accordingly, embodiments of the present invention provide a method and apparatus for automatically detecting and correcting the input error that occurs during pen input in an input apparatus capable of both a touch input of the capacitive scheme and a pen input of the EMR scheme.

Generally, events occurring by an input scheme, such as a mouse input, a touch screen input, and a pen input, may include three different types of events: a Detect event occurring when an initial input is detected; a Move event occurring when input coordinates are changed with the input being maintained; and a Release event occurring when the input is released.

Figure 2:
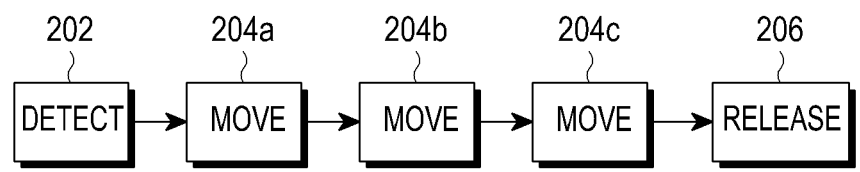
FIG. 2 is a diagram illustrating a flow of input events occurring during touch screen input.

Accordingly, the input apparatus may generally detect events according to the flow shown in FIG. 2.

FIG. 2 is a diagram illustrating a flow of input events occurring during touch screen input. As shown in FIG. 2, during touch screen input, a Detect event 202 occurs from the initial contact, Move events 204*a*-204*c* occur from the movement of an input position, and a Release event 206 occurs if the input is released. The Move events 204*a*-204*c* may occur any number of times before the Release event 206 occurs. Further, the flow of input events may proceed directly from the Detect event 202 to the Release event 206 without any Move events 204a-204c there between.

Figure 3:
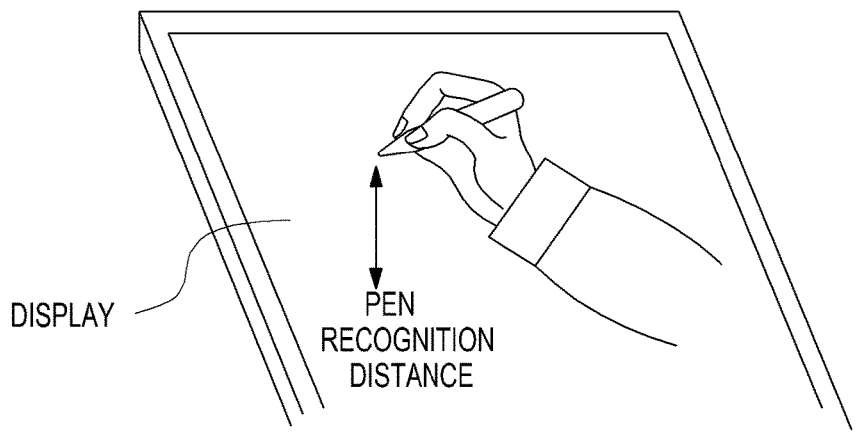
FIG. 3 is a diagram illustrating occurrence of an input error unintended by a user during pen input.

FIG. 3 is a diagram illustrating occurrence of an input error unintended by a user during pen input. As shown in FIG. 3, when a user performs a pen input, the bottom of the user's hand may touch the screen before a distance between the pen and the screen is less than or equal to the pen recognition distance set in an EMR sensor. In this case, the input apparatus may detect input events according to the flow shown in FIG. 4.

Figure 4:
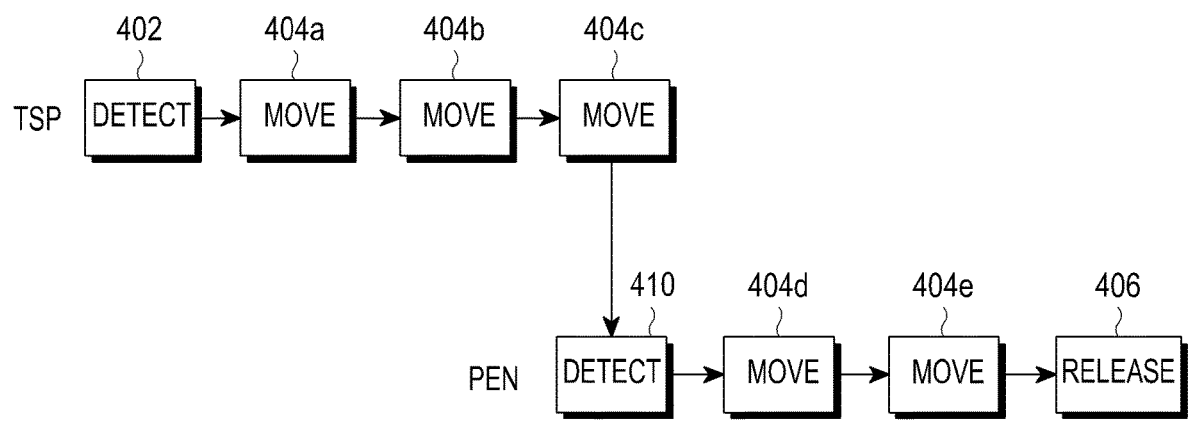
FIG. 4 is a diagram illustrating a flow of input events when an input error occurs as shown in FIG. 3.

FIG. 4 is a diagram illustrating a flow of input events when an input error occurs according to FIG. 3. Generally, during pen input, the bottom of the hand touches the touch screen before the pen touches the touch screen. Accordingly, a touch input by the hand is detected first at Detect event 402 before the pen input is detected at Detect event 410. After the Detect event 402, Move events 404a-404c by a hand input may occur. The Detect event 410 may occur before a Release event 406 of the touch input by the hand occurs. Additional Move events 404d and 404e are entered via the hand or the pen after the Detect event 410.

Figure 5:
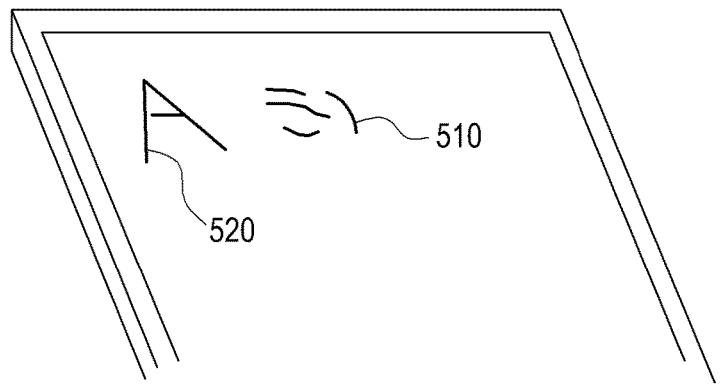
FIG. 5 is a diagram illustrating input results when an input error unintended by a user has occurred during pen input.

FIG. 5 is a diagram that illustrates input results when an input error unintended by a user has occurred during pen input. The input results shown in FIG. 5 occur due to the activities in FIG. 4. In this case, in addition to a pen touch input 520 intended by the user, an unnecessary input 510 by a hand touch input occurs, which is unintended by the user.

In an embodiment of the present invention, in order to correct this input error, if a Detect event by the pen occurs after a touch input by the hand and before the touch input by the hand is released, the execution of activities having occurred by the hand touch inputs are cancelled. Thus, it is determined that the hand touch inputs are unintended inputs. For example, if a stroke was drawn by the hand touch input, the drawn stroke may be deleted. If the screen was rotated by the hand touch input, the rotated screen may be restored back to the previous screen.

Embodiments of the present invention store information about an activity corresponding to each event during occurrence of events by the input apparatus, and cancel the execution of the activity when the current touch input is determined as an erroneous input.

Figure 6:
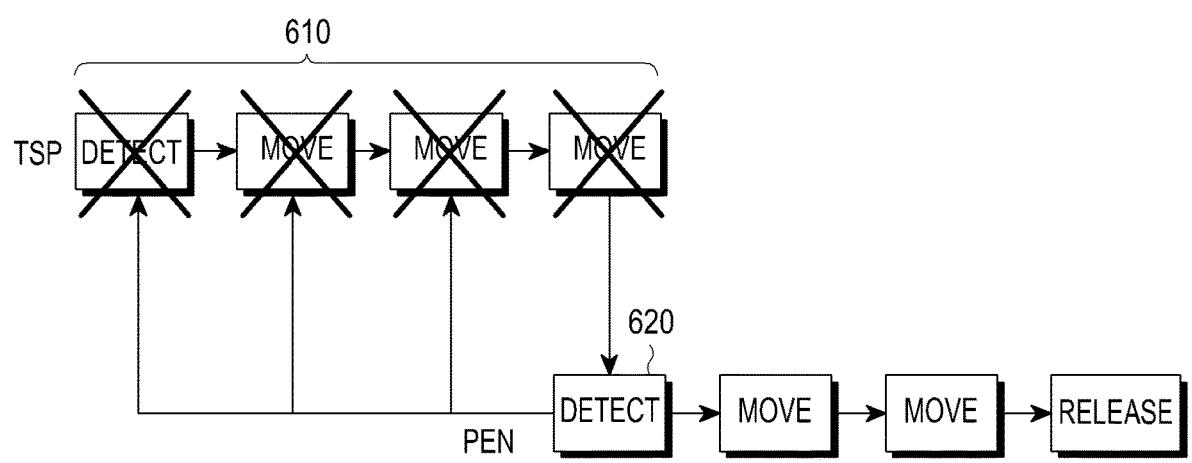
FIG. 6 is a diagram illustrating an operation of cancelling input events to correct an input error upon occurrence of an input error unintended by a user, according to an embodiment of the present invention.

FIG. 6 is a diagram illustrating an operation of cancelling input events to correct an input error upon occurrence of an input error unintended by a user, according to an embodiment of the present invention. If a pen input starts after the hand first touched the touch screen, a Detect event and Move events 610, having occurred by the hand touch inputs prior to the moment that a Detect event 620 by a pen input occurs, are cancelled, as shown in FIG. 6.

Because the Detect event 620 by the pen input has occurred before a Release event by a hand input occurs, it is determined that the current touch input by the hand input corresponds to an unintended user event. Therefore, the activities executed by the events having occurred by the hand inputs are cancelled, thereby correcting the input errors unintended by the user.

In another embodiment of the present invention, in order to correct an input error, if a Detect event by the pen has occurred within a preset time after occurrence of a touch input by the hand, the execution of activities resulting from the hand touch inputs are cancelled. Thus, it is determined that the hand touch inputs are unintended erroneous inputs.

Generally, during pen input, even though a part of the hand first touched the touch screen, an input by the pen may occur immediately. Therefore, if a Detect event by the pen has occurred within a preset time after a touch input by the hand occurred, the execution of activities resulting from the hand touches may be cancelled.

Figure 7:
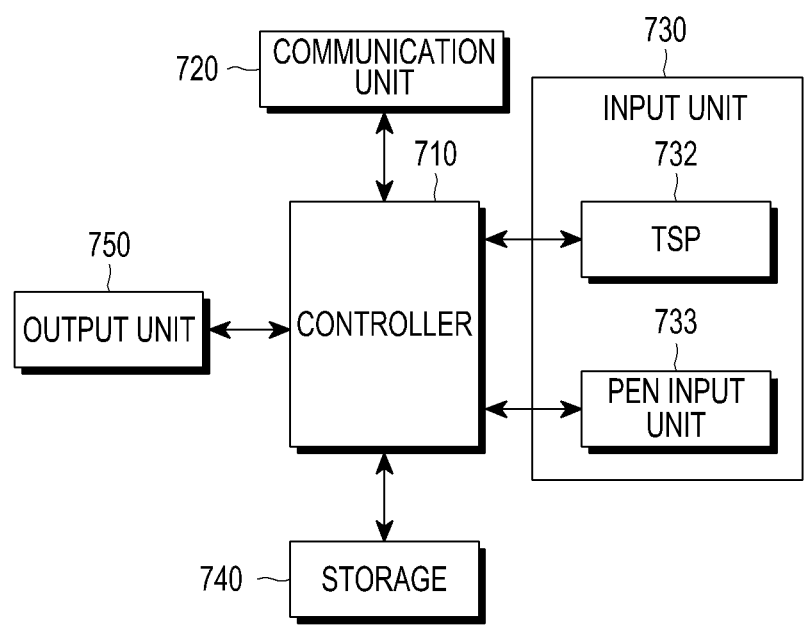
FIG. 7 is a diagram illustrating a structure of an input error correction apparatus, according to an embodiment of the present invention.

FIG. 7 is a diagram illustrating a structure of an input error correction apparatus, according to an embodiment of the present invention.

Referring to FIG. 7, the input error correction apparatus includes a communication unit 720, an output unit 750, a storage 740, a controller 710, and an input unit 730.

The input unit 730 includes a TSP 732 for detecting a touch input of the capacitive scheme, and a pen input unit 733 for detecting a touch input of the EMR scheme. The input unit 730 may further include an input means for receiving user inputs, such as a keyboard and a mouse.

The output unit 750, which may include, for example, an LCD or OLED display panel, outputs display information based on a control signal from the controller 710. The output unit 750 corresponds to the display panel module 120 in FIG. 1.

The communication unit 720 is used by the input error correction apparatus to communicate with other devices.

The storage 740 stores information necessary for an operation of the input error correction apparatus. In accordance with an embodiment of the present invention, the storage 740 stores activity execution information when an activity corresponding to each touch input event is executed according to the touch input of the capacitive scheme. The stored information includes information necessary to cancel the executed activities if needed, such as, for example, state change information and setting information for each activity.

The controller 710 controls components of the input error correction apparatus.

In accordance with an embodiment of the present invention, upon detecting a touch input of the capacitive scheme, the controller 710 executes an activity corresponding to the detected input and stores activity execution information in the storage 740. If a touch input of the EMR scheme has occurred before the touch input of the capacitive scheme is released, the controller 710 cancels the activity executed by the touch input of the capacitive scheme.

In accordance with another embodiment of the present invention, upon detecting a touch input of the capacitive scheme, the controller 710 starts a timer that operates for a preset time, executes an activity corresponding to the detected input, and stores activity execution information in the storage 740. If a touch input of the EMR scheme has occurred before the timer expires, the controller 710 cancels the activity executed by the touch input of the capacitive scheme. The timer may be set to operate for 1 to 3 seconds.

If the pen accesses the touch screen within the pen recognition distance during pen input, the controller 710 does not execute activities corresponding to touch inputs of the capacitive scheme.

Figure 8:
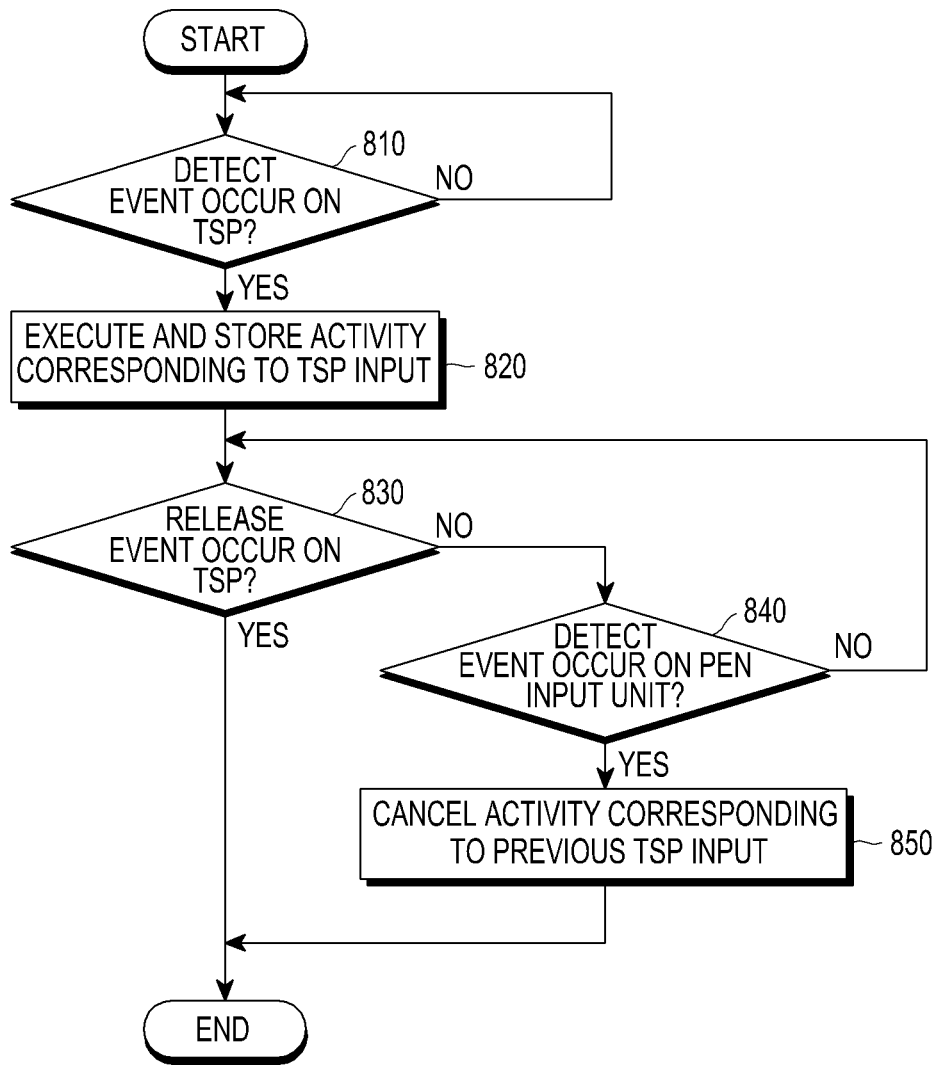
FIG. 8 is a diagram illustrating a flow of an input error correction operation, according to an embodiment of the present invention.

FIG. 8 is a flow diagram illustrating input error correction, according to an embodiment of the present invention.

Referring to FIG. 8, the controller 710 determines whether a Detect event has occurred on the TSP 732 of the input unit 730, in step 810. If a Detect event has not occurred, the controller 710 awaits the Detect event and repeats step 810. If a Detect event has occurred on the TSP 732, the controller 710 proceeds to step 820.

In step 820, the controller 710 executes an activity corresponding to the touch input, and stores activity execution information in the storage 740. The storing of activity execution information is required for cancellation of the executed activity if it is determined that the current touch input is an input unintended by the user. Accordingly, the controller 710 stores in the storage 740 the information necessary to cancel the executed activities, such as, for example, state change information and setting information for each activity.

The controller 710 determines whether a Release event has occurred on the TSP 732, in step 830. If a Release event has occurred on the TSP 732, the controller 710 ends the operation, determining that the current touch input is a normal touch screen input.

However, if a Release event has not occurred on the TSP 732 in step 830, the controller 710 determines whether a Detect event has occurred on the pen input unit 733, in step 840. If a Detect event has not occurred on the pen input unit 733, the controller 710 returns to step 830 to determine if a Release event has occurred on the TSP 732. If a Detect event has occurred on the pen input unit 733, the controller 710 cancels the previous activity corresponding to the input on the TSP 732, in step 850. Specifically it is determined that the touch input entered on the TSP 732 is unintended by the user. The controller 710 cancels the activity based on the activity execution information stored in the storage 740 in step 820.

Figure 9:
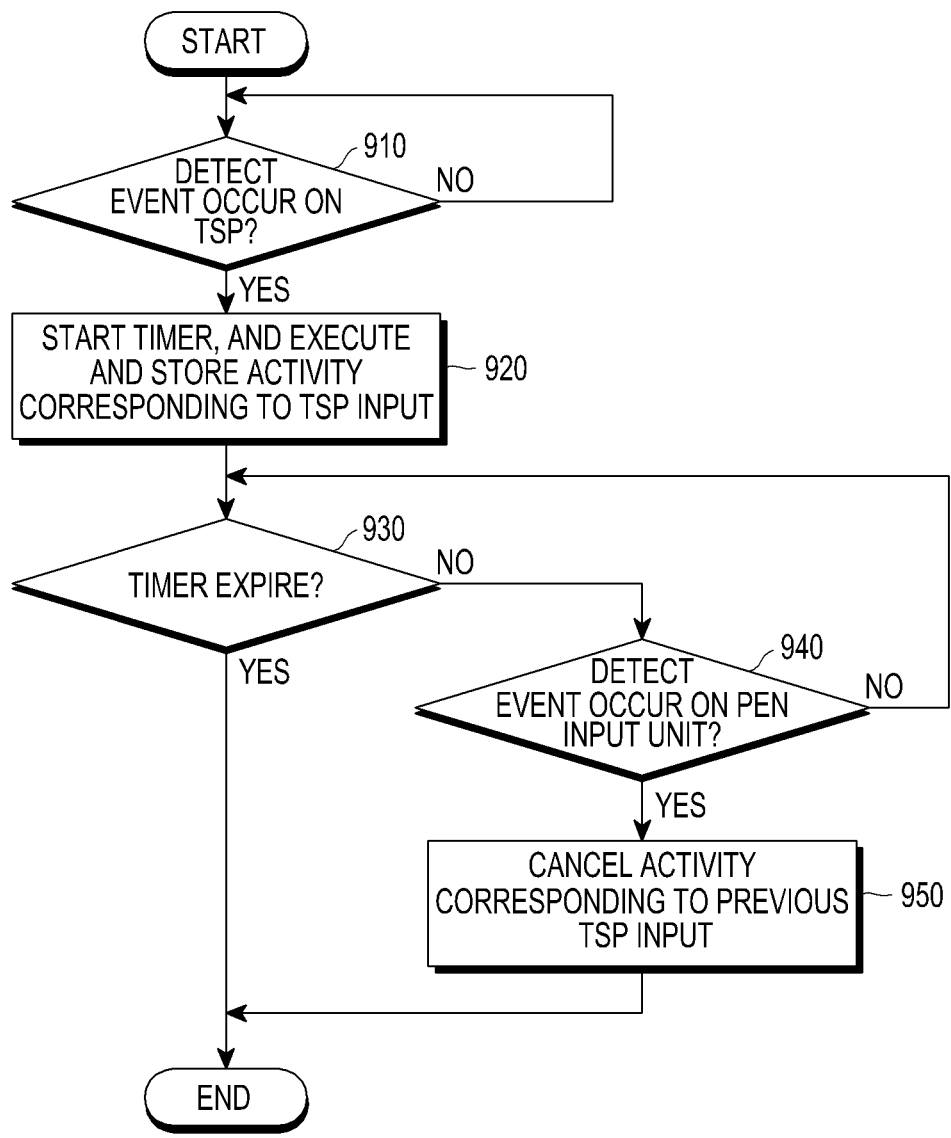
FIG. 9 is a diagram illustrating a flow of an input error correction operation, according to another embodiment of the present invention.

FIG. 9 is a flow diagram illustrating input error correction, according to another embodiment of the present invention.

Referring to FIG. 9, the controller 710 determines whether a Detect event has occurred on the TSP 732 of the input unit 730, in step 910. If a Detect event has not occurred, the controller 710 waits for the Detect event and repeats step 910. If a Detect event has occurred on the TSP 732, the controller 710 proceeds to step 920.

In step 920, the controller 710 sets a preset timer, executes an activity corresponding to the touch input, and stores activity execution information. The storing of the activity execution information is for cancellation of the executed activity if it is determined that the current touch input is unintended by the user. Accordingly, the controller 710 stores in the storage 740 the information necessary to cancel the executed activities, such as, for example, state change information and setting information for each activity.

The controller 710 determines whether the timer set in step 920 has expired, in step 930. If the timer has expired in step 930, the controller 710 ends the operation, determining that the current touch input is a normal touch screen input.

However, if the timer has not expired in step 930, the controller 710 determines whether a Detect event has occurred on the pen input unit 733, in step 940. Thus, it is determined whether a Detect event has occurred on the pen input unit 733 within a preset time (or a time set in the timer) after the initial Detect event occurred on the TSP 732.

If a Detect event has not occurred on the pen input unit 733 in step 940, the controller 710 returns to step 930 to determine whether the timer has expired. If a Detect event has occurred on the pen input unit 733, the controller 710 cancels the previous activity corresponding to the input on the TSP 732, in step 950. Thus, it is determined that the touch input entered on the TSP 732 is unintended by the user. The controller 710 cancels the activity based on the activity execution information stored in step 920.

As is apparent from the foregoing description of embodiments of the present invention, the input error correction methods and apparatus may provide a stable pen input environment by automatically detecting and correcting a touch input error which may occur due to the user's unintended hand touches during pen input in an input apparatus capable of a touch screen input of the capacitive scheme and a pen input of the EMR scheme.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method of an electronic device, comprising:
identifying a first touch input based on a capacitive scheme;
based on identifying the first touch input, starting a timer that operates for a preset time;
displaying a first stroke on a touch screen according to a movement of the first touch input on the touch screen of the electronic device;
receiving a second touch input while the first touch input is maintained and the first stroke is displayed on the touch screen;
identifying whether the second touch input is received during the preset time;
based on identifying that the second touch input is received during the preset time:
identifying whether the second touch input is received by an electronic pen based on an electromagnetic resonance (EMR) scheme;
based on identifying that the second touch input is received by the electronic pen based on the EMR scheme, erasing the first stroke on the touch screen and displaying a second stroke according to a movement of the second touch input on the touch screen, wherein erasing the first stroke and displaying the second stroke are performed based on the second touch input; and
based on identifying that the second touch input is received based on the capacitive scheme, maintaining the displaying of the first stroke and displaying a third stroke according to a movement of the second touch input on the touch screen; and
based on identifying that the second touch input is received after the preset time elapses, maintaining the displaying of the first stroke and displaying a fourth stroke according to a movement of the second touch input on the touch screen.

2. The method of claim 1, further comprising:
executing a first activity corresponding to a first detect event, when the first detect event occurs based on the first touch input; and
executing a second activity corresponding to a move event, when the move event occurs based on the second touch input.

3. The method of claim 1, further comprising:
cancelling the first activity, when a second detect event occurs based on the second touch input before the first touch input is released.

4. An electronic device comprising:
a touch screen; and
at least one processor configured to:
identify a first touch input based on a capacitive scheme,
based on identifying the first touch input, start a timer that operates for a preset time,
control the touch screen to display a first stroke on the touch screen according to a movement of the first touch input on the touch screen,
receive a second touch input by an electronic pen while the first touch input is maintained and the first stroke is displayed on the touch screen,
identify whether the second touch input is received during the preset time, based on identifying that the second touch input is received during the preset time:
  identify whether the second touch input is received by an electronic pen based on an electromagnetic resonance (EMR) scheme,
  based on identifying that the second touch input is received by the electronic pen based on the EMR scheme, erase the first stroke on the touch screen and control the touch screen to display a second stroke according to a movement of the second touch input while the first touch input is maintained, wherein erasing the first stroke and displaying the second stroke are performed based on the second touch input, and
  based on identifying that the second touch input is received based on the capacitive scheme, maintain the displaying of the first stroke and display a third stroke according to a movement of the second touch input on the touch screen, and based on identifying that the second touch input is received after the preset time elapses, maintain the displaying of the first stroke and display a fourth stroke according to a movement of the second touch input on the touch screen.

5. The electronic device of claim 4, wherein the at least one processor is further configured to:
  execute a first activity corresponding to a first detect event, when the first detect event occurs based on the first touch input, and
  execute a second activity corresponding to a move event, when the move event occurs based on the second touch input.

6. The electronic device of claim 5, wherein the at least one processor is further configured to:
  cancel the first activity or the second activity, when a second detect event occurs based on the second touch input before the first touch input is released.

* * * * *